Nov 24, 1953 D. W. BLANCHER 2,660,710

HIGH-FREQUENCY COUPLING SYSTEM

Filed July 9, 1951

INVENTOR.
D. W. BLANCHER

BY

ATTORNEY

Patented Nov. 24, 1953 2,660,710

UNITED STATES PATENT OFFICE 2,660,710

HIGH-FREQUENCY COUPLING SYSTEM

Donald W. Blancher, North Hollywood, Calif., assignor to Bendix Aviation Corporation, North Hollywood, Calif., a corporation of Delaware Application July 9, 1951, Serial No. 235,724

3 Claims. (Cl. 333—11)

Figure 1:
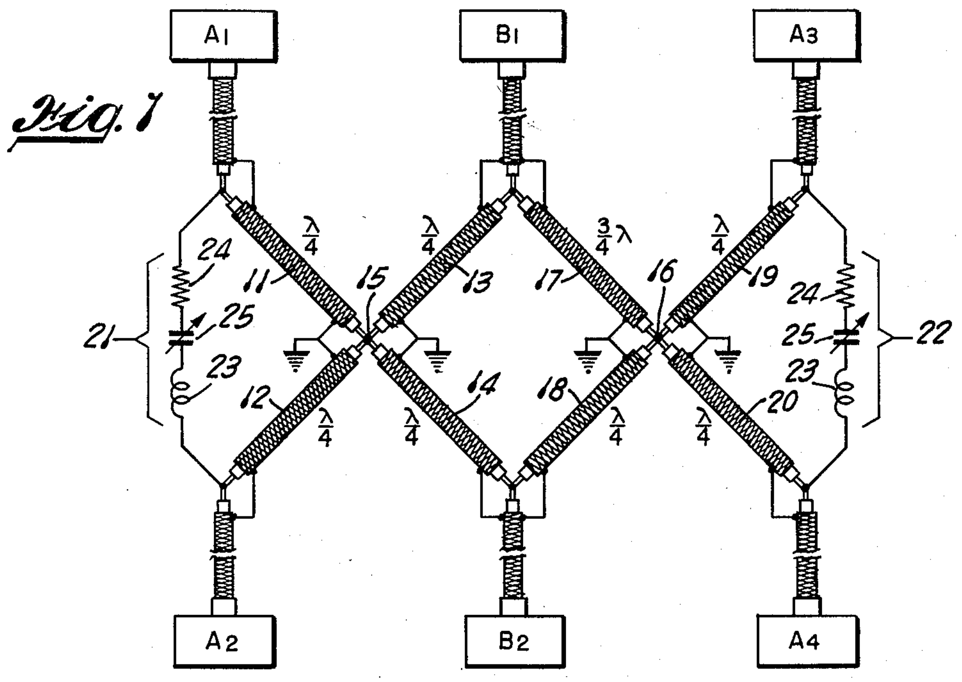

This invention relates to high frequency coupling systems for coupling certain ones of a plurality of devices to each other, while preventing coupling between others of the devices.

An object of the invention is to provide a network that will couple each of a plurality of devices in one group to each of two devices in another group while preventing intercoupling between the devices of the one group.

Briefly, this object is achieved by providing two paths from each device to every other device, the paths having characteristics such that the two paths between each pair of devices situated in different groups produce the same relative phase shift, causing addition of energy, whereas the two paths between each pair of devices within the same group produce phase shifts and current amplitudes such that cancellation is effected, thereby isolating the devices within a given group from each other.

Figure 2:
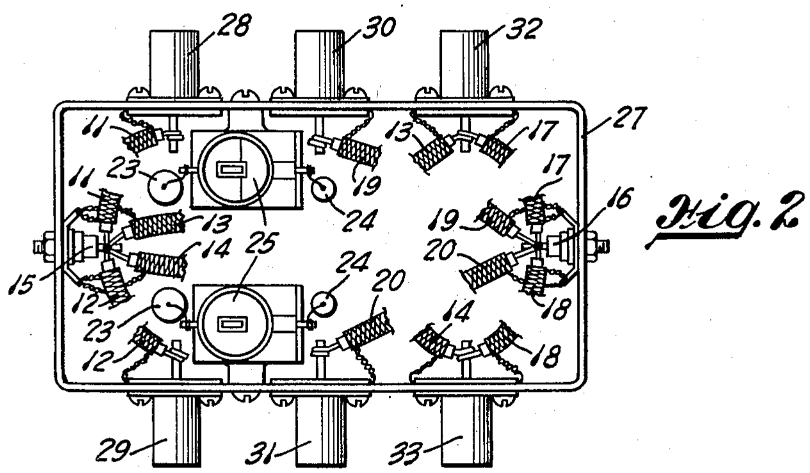

The construction of the system whereby the paths have the desired phase-shifting properties will be described with reference to the drawing, in which:

Fig. 1 is a schematic diagram showing a circuit in accordance with the invention for coupling four devices to two other devices; and Fig. 2 is a plan view of coupling apparatus in accordance with the circuit of Fig. 1, housed in a casing, with the casing cover removed.

Referring to Fig. 1, there is shown a circuit for coupling four devices A1, A2, A3 and A4, constituting group A, to two devices B1 and B2, constituting group B, or vice versa. The group A devices may be transmitters or receivers, and the group B devices may be antennas.

The device A1, the device A2, the device B1 and the device B2 are connected by four coaxial lines 11, 12, 13 and 14 to a common terminal 15, and the device B1, device B2, device A3 and device A4 are connected to a common terminal 16 by four coaxial lines 17, 18, 19 and 20. The two devices A1 and A2 are connected directly together by a series resonant network 21 and the two devices A3 and A4 are connected together by a series resonant network 22.

Each series resonant circuit 21 and 22 comprises a condenser 25 and an inductance 23 of such size as to have equal reactances at the operating frequency, and a resistor 24 having a resistance approximately equal to the resistances of the devices B1 and B2. The cross-sectional dimensions of the coaxial lines 11 to 14 and 17 to 20 are so chosen that the lines have a characteristic resistance approximately 1.414 times that of the devices B1 and B2 at the operating frequency.

The lengths of the coaxial lines 11, 12, 13, 14, 18, 19 and 20 are all a quarter wave length, but the length of the coaxial line 17 is three-quarter wave length. This arrangement provides for transmission from each group A device to each group B device over paths which provide phase shifts which produce wave addition at the group B device, but provides two paths having phase shifts differing by 180° between any pair of group A devices.

Thus device A1 is connected by coaxial lines 11 and 13 to device B1, with a phase shift of one-half wave length or 180°. Device A1 is also connected to device B2 over lines 11 and 14 with a phase shift of 180°. Device A3 is connected over lines 19 and 17 to device B1 with a phase shift of one wave length, and device A3 is connected to device B2 over lines 19 and 18 with a phase shift of one-half wave length or 180°. Device A4 is connected to device B1 over lines 20 and 17, producing a total phase shift of one wave length, and is connected to device B2 over lines 20 and 18 producing a total phase shift of 180°. Device A2 is connected to device B1 over lines 12 and 13 with a phase shift of 180°, and is connected to device B2 over lines 12 and 14, with a phase shift of 180°.

All four devices of group A are electrically isolated from each other by virtue of the fact that there are two paths for current between each of them, and the two paths produce phase shifts differing by approximately 180°. Thus device A1 is connected to device A2 over one path comprising the tuned series circuit 21, which produces a phase shift of 360°, and the two lines 11 and 12, which produce a phase shift of 180° and proper amplitude for cancellation.

Tracing a circuit from device A1 toward devices A3 and A4, it will be observed that current can flow over line 11 to the common terminal 15 and there divide, a part flowing over the line 13 and over the line 17 to common terminal 16, and the other part flowing over the line 14 and the line 18 to common terminal 16. However, the current taking the path over lines 13 and 17 will have a total phase shift of one wave length, whereas that traversing the lines 14 and 19 will have a phase shift of only one-half wave length. Hence these currents will cancel out at point 16. This electrically isolates the device A1 from both the device A3 and the device A4.

The device A2 is similarly isolated from devices A3 and A4, since from the point 15 current from the device A2 would divide exactly the same as current from device A1 in going toward the devices A3 and A4.

Device A3 is isolated from device A4 by virtue of the fact that it is connected thereto over the two lines 19 and 20 producing a total phase shift of 180°, and also through the tuned series circuit 22 which produces a phase shift of 360° and the proper amplitude to cancel the energy arriving via the lines 19 and 20.

The two devices B1 and B2 are isolated from each other because there are two paths interconnecting them, one including the lines 13 and 14 producing a phase shift of 180°, and the other over lines 17 and 18 producing a phase shift of 360°.

It is not essential that the individual coaxial lines be quarter wave length and three-quarter wave length as described, although these are the shortest lines that will give the results. It is merely necessary that all the lines be an odd quarter wave in length, and, that one of the lines 13, 14, 17 or 18 differ in length from all the rest by one half-wave length. Usually it is desirable to make the lines as short as possible.

The system described is particularly useful where a number of sources of high frequency current (the group A devices) differing slightly in frequency or of the same frequency and not necessarily of the same or constant phase difference are transmitted over a common radio channel, but transmission is effected over a single radiating array (the group B devices) to produce more uniform transmission under all conditions than would be produced by using a separate antenna for each source. Although in the system of Fig. 1 the equipment might be adapted to have the properties described at the single frequency say, 230 mc., the four devices A1, A2, A3, and A4 could have slightly different frequencies ranging from 215 mc. to 235 mc.

Construction of the equipment is greatly simplified by the fact that two of the current paths consist of the tuned series circuits 21 and 22 in Fig. 1. By making the inductance or the condenser in each tuned circuit variable, final adjustment can be quickly and easily obtained. Where coaxial lines alone are used in constructing a network, the length of the lines must be very exact, and difficulty is often encountered in producing apparatus which can be tuned only in this manner. In the present system, slight variations in the lengths of the coaxial lines can be compensated for with the tuning of the series resonant circuits.

The apparatus of the system shown in Fig. 1 can be contained in a compact housing because the coaxial lines can be coiled or folded into a small space. Thus there is shown in Fig. 2 a casing 27 in which the elements of the coupling system of Fig. 1 are contained. The casing 27 has, on opposite sides thereof, six line connectors shown as coaxial cable terminals 28, 29, 30, 31, 32 and 33 for connection to the lines leading to the devices A1, A2, A3, A4, B1 and B2 respectively. The common terminals 15 and 16 are shown mounted in the end walls of the casing. The variable condensers 25 of the series resonant circuits 21 and 22 are secured to the side walls of the casing 27 in positions where they are accessible for tuning. The remaining space is occupied by the resistors 24, inductances 23 and the coaxial lines, only the end portions of which are shown in Fig. 2. The casing 27 can be about 2¼ in. x 5 in. x 2 in. for a 230 mc. system.

The system of Fig. 1 is reversible; thus the devices of group A can be either transmitters or receivers and the devices of group B can be antennas capable of functioning either for transmission or reception. When the circuit is used in a receiving system it has the advantage that each receiver is energized from both antennas without intercoupling between the receivers. If the receivers are of the type employing local oscillators, this prevents undesirable beats and "pulling" between the local oscillators of the different receivers.

Each of the devices of group A, i. e., A1, A2, A3 and A4, can alternatively, be a combined transmitter and receiver.

An important advantage of the invention is that the internal impedances of the devices A1, A2, A3 and A4 do not have to be equal, since they are, in effect, electrically isolated from each other. As a result, if less than four group A devices are desired, one or more of the terminals 28, 29, 30, 31 can be left blank or shorted without appreciably affecting the operation of the devices connected to the remaining terminals.

The system has relatively broad band characteristics being operative over a band varying approximately ten percent above and below the mean frequency.

Although the coaxial lines and the series tuned circuits have been described as producing phase shifts of quarter wave length, three quarter wave length or one wave length, exact phasing is not essential to successful operation, and in practice the phase shift may depart appreciably from the ideal values given.

Although for the purpose of explaining the invention a particular embodiment thereof has been shown and described, obvious modifications will occur to persons skilled in the art and we do not desire to be limited to the exact details shown and described.

I claim:

1. A high frequency coupling device for coupling a first pair of lines to a second pair of lines at a predetermined operating frequency comprising: first and second pairs of line connectors for connection to said first and second pairs of lines respectively; a common terminal; four coaxial lines directly connecting said common terminal to said respective line connectors, each of said coaxial lines being an odd quarter-wave in length; a resonant circuit containing lumped inductance, resistance, and capacity elements connected in series between one pair of said line connectors, and resonating substantially at said predetermined frequency, and coupling means having a phase shift of an even number of quarter wave lengths connected between the other pair of line connectors.

2. A high frequency coupling device for coupling first and third pairs of lines to a second pair of lines at a predetermined operating frequency comprising: first and second junction terminals; first, second and third pairs of line connectors for connection to said first, second and third pairs of lines respectively; a first set of four coaxial lines directly connecting said first junction terminal to the respective line connectors of said first and second pairs; a second set of four coaxial lines directly connecting said second junction terminal to the respective line connectors of said second and third pairs; all of said coaxial lines being an odd quarter wave in length, and one of the coaxial lines connected to one of said second pair of lines differing in length from all of the rest by one half wave length; and a resonant circuit containing lumped inductance, resistance, and capacity elements connected in series between said first pair of line connectors and resonating substantially at said operating frequency.

3. A coupling system according to claim 2 including a resonant circuit containing lumped inductance, resistance, and capacity elements connected in series between said third pair of said line connectors.

DONALD W. BLANCHER.

References Cited in the file of this patent

UNITED STATES PATENTS

| Number | Name | Date |
|---|---|---|
| 2,251,997 | Goldmann | Aug. 12, 1941 |
| 2,267,445 | Cork | Dec. 23, 1941 |
| 2,416,790 | Barrow | Mar. 4, 1947 |
| 2,445,895 | Tyrrell | July 27, 1948 |